United States Patent

Derr, Jr.

[15] 3,690,699
[45] Sept. 12, 1972

[54] ANTI-SWAY DEVICE FOR TRAILER HITCHES

[72] Inventor: M. Arthur Derr, Jr., 17 Richard Court, Orinda, Calif. 94563

[22] Filed: Aug. 12, 1970

[21] Appl. No.: 63,191

Related U.S. Application Data

[63] Continuation-in-part of Ser. No. 21,635, March 23, 1970, abandoned.

[52] U.S. Cl. ..............................280/446 B, 280/433
[51] Int. Cl. ..........................B60d 1/06, B62d 53/00
[58] Field of Search.......280/446, 432, 433, 438, 460

[56] References Cited

UNITED STATES PATENTS

| | | | |
|---|---|---|---|
| 2,892,639 | 6/1959 | Parsons | 280/460 |
| 2,709,088 | 5/1955 | Orbits | 280/432 |
| 3,194,584 | 7/1965 | Reese | 280/406 A |
| 3,520,556 | 7/1970 | Warner | 280/406 A |
| 2,468,705 | 4/1949 | Price | 280/432 |
| 2,940,776 | 6/1960 | Curtis | 280/446 B |
| 3,306,628 | 2/1967 | Haxton | 280/446 B |

FOREIGN PATENTS OR APPLICATIONS

922,867   4/1963   Great Britain .........280/446 B

*Primary Examiner*—Leo Friaglia
*Attorney*—Townsend and Townsend

[57] ABSTRACT

A device for preventing trailers hitched to passenger automobiles or tractors from swaying under the influence of lateral forces commonly encountered during relatively high speed straight line travel on highways. The device comprises a flat plate having a groove that faces and is engaged by a detent. The plate and the detent are mounted to the towing vehicle and the trailer and they are biased towards each other so that a torque of a predetermined magnitude is necessary to disengage the detent and the groove and permit sideway swaying, or relative angular movement of the trailer. After the detent is disengaged the necessary force to cause additional angular movements is reduced. The anti-sway device can be mounted to and used with conventional, already installed trailer hitches.

41 Claims, 17 Drawing Figures

FIG_11

FIG_12

FIG_14

FIG_13

FIG_15

FIG_16

INVENTOR.
M. ARTHUR DERR, JR.

BY
Townsend and Townsend
ATTORNEYS

FIG_17

INVENTOR.
M. ARTHUR DERR, JR.

ANTI-SWAY DEVICE FOR TRAILER HITCHES

RELATED APPLICATIONS

This application is a continuation-in-part application of copending patent application Ser. No. 21,635, filed Mar. 23, 1970 for ANTI-SWAY DEVICE FOR TRAILER HITCHES and now abandoned.

BACKGROUND OF THE INVENTION

Trailers are presently being towed in large numbers over high traffic highways at relatively high speeds. To assure maximum control over the trailer as well as the vehicle and to reduce the likelihood of loss of control over the vehicle-trailer rig it is necessary to control the movements of the trailer as closely as possible.

Conventional ball joint trailer hitches, as commonly found on private automobiles and trailers that can be towed with them, provide a universally movable joint between the towing vehicle and the trailer. However, they provide for relatively poor and unsatisfactory control over the trailer, particularly during high speed driving, since the trailer is free to sway sideways behind the vehicle under the influence of lateral forces. Such forces are frequently encountered from cross-winds, road crowns and during high speed maneuvers such as the passing of a vehicle. Forces developed by the swaying trailer are transmitted to the vehicle via the ball hitch and have a tendency to cause sideway movements of the vehicle. When strong enough the forces can be sufficient to cause a loss of control over the vehicle and an accident with serious or even fatal consequences.

Attempts have heretofore been made to reduce such swaying of the trailer. Most commonly a friction device is employed between the vehicle and the trailer, which acts on a shock absorber principle and inhibits pivotal movements of the trailer about the hitch ball. Such devices reduce swaying to a limited extent only. The most serious drawback of such devices, however, is the fact that an increased anti-sway effectiveness also results in an increased resistance of the device against returning the trailer into alignment with the vehicle. Failure to quickly return the trailer into alignment can have consequences which are substantially more serious than the swaying of the trailer when no anti-sway devices are employed due to the resulting misalignment between the rig position and the travel path. Thus, such devices have not improved trailer hitches in general and trailer sway in particular to an appreciable extent.

Another approach to reducing trailer sway has been suggested in U.S. Pat. No. 2,940,776. In accordance with that approach the conventional ball hitch connection is inactivated, that is it is rigidified, and a compound connection dividing the universal movability of the ball joint among multiple components is provided. Principally, a vertical weight transmitting member is interposed between the trailer hitch and the vehicle and resiliently positioned in a groove when the tow vehicle and the trailer are aligned. Tapered surfaces are disposed on each side of the groove. Angular deflection between the vehicle and the trailer pivots the member out of the groove and along the tapered sides. Thus, the resistance of the joint against angular deflection increases with the magnitude of such deflection for purposes of providing a load equalizing function for the hitch.

Aside from the structural complexity of the hitch disclosed in the above referenced U.S. Patent and the costliness of its manufacture it functions poorly, particularly since the combination of the anti-sway feature and the load equalizing feature place opposing demands on the hitch. Their combination requires compromises in the hitch construction which impair its operation. For example, the hitch provides for an increase in its resistance against angular deflection to obtain a desired load equalizing feature which, however, is contrary to the optimal functioning of an anti-sway hitch. For anti-sway control greatest forces opposing pivotal movements of the trailer about the hitch are required while the trailer is aligned with the towing vehicle so that it continues its straight line travel when subjected to extraneous, lateral forces. However, once the rig makes a sharp turn such control is no longer necessary and the ease with which the trailer can pivot about the hitch should increase. Thus, the hitch disclosed in that patent is, from the point of view of trailer sway control, relatively unsatisfactory.

Trailer hitches which eliminate the groove disclosed in the above referenced U.S. patent and provide continuous tapers to each side from a center portion are also known. Such hitches have substantially similar characteristics and shortcomings as those constructed according to that patent.

A further problem encountered with universally movable trailer hitches employed on passenger automobiles are relative vertical movements of the towing vehicle and the trailer about a horizontal axis, or jouncing, when the vehicle or the trailer drive through a depression or a protrusion in the roadway as is frequently encountered at ends of bridges. It causes oscillations of the trailer about the ball hitch, raises and lowers the front end of the towing vehicle and increases and decreases the load applied to the front wheels. This not only results in an uncomfortable sensation but can become dangerous and result in a loss of control over the towing vehicle during adverse road conditions and/or during side winds.

The above described shortcomings of prior art trailer hitches are particularly noticeable on a semi-trailer coupled to towing vehicles such as tractors or trailer front wheel assemblies. Jackknifing of such rigs is a common phenomenon and is most frequently encountered during icy or slippery road conditions when it is relatively easy for the semi-trailer to swing out of alignment with respect to the tractor when the brakes are applied. The momentum of the trailer and the simultaneous deceleration of the tractor swings the former sideways and forward where it can hit the driver's cab. Semi-trailer jackknifings are one of the most extreme hazards encountered on the roadway. No effective means for preventing such jackknifing of the large semi-trailer rings has heretofore been available.

SUMMARY OF THE INVENTION

The present invention provides apparatus for preventing oscillations between a towing vehicle and a towed trailer during relatively high speed straight line travel of the two to prevent the trailer from swaying under lateral forces acting thereon. Briefly, the apparatus comprises detent means connected to the vehicle and the trailer for releasably maintaining the two in mutual alignment and requiring the application of a first, relatively greater torque thereto before an initial, slight angular deflection between the vehicle and the trailer can take place. Means are further provided to thereafter permit an additional angular deflection between the trailer and the vehicle which require a relatively lesser torque which remains substantially constant for such additional angular deflection.

In the presently preferred embodiments the anti-sway trailer device of the present invention is adapted for use with substantially all commonly available trailer hitches and particularly for the widely used conventional ball hitch trailer connections. The anti-sway device comprises simple, readily manufactured and relatively inexpensive components to assure a low initial price for the device. Furthermore, the simple construction of the device enables its installation by unskilled persons, such as the hitch owner, without the need for expensive equipment or special skills and allows for the use of standard components such as relatively short shafted hitch balls employed by prior art ball hitches to enable a low cost conversion of prior art hitches to hitches constructed according to this invention.

In a first preferred form for use with passenger autos, the anti-sway device of the present invention comprises first and second members which are secured to the towing vehicle and the trailer but which are independent of each other so that a release of the coupling, e.g. the ball hitch between the vehicle and the trailer, automatically releases the anti-sway device. This assures its convenient use. Moreover, the members become automatically engaged upon making the connection between the vehicle and the trailer so that the anti-sway device is automatically actuated whenever the trailer is coupled to the vehicle.

One of the members comprises a substantially horizontal, grooved plate which has flat sides extending from the grooves and which is rigidly mounted concentrically about the vertical axis through the ball joint to prevent rotational movements of the plate. The other member has a detent that can engage the groove in the plate and is biased towards the plate with an adjustable force. The groove and the detent are so positioned that they are in mutual engagement when the vehicle and the trailer are aligned. During straight-away travel lateral forces acting on the trailer cannot pivot it about the ball joint until they exert a force which is greater than the force exerted by the detent in the groove in opposition to such movement. This opposing force can be adjusted so that all commonly encountered lateral forces are unable to cause swaying of the trailer.

When making sharp turns, as when turning into a street at low speeds or while backing the trailer into a parking stall, a high torque is developed in the ball joint which is sufficient to disengage the detent and the groove. When the two are fully disengaged, that is after a slight initial deflection, the required torque to continue such pivotal movement of the trailer becomes constant and becomes substantially less than the initially required torque. When the vehicle and the trailer become again aligned the detent automatically engaged the groove to provide the desired anti-sway function.

To allow for universal movability of the trailer hitch, the groove and detent are vertically spaced, e.g. below the center of the ball joint of the hitch and extend perpendicularly to the longitudinal axis between the vehicle and the trailer. This accomodates pivotal movement between the vehicle and the trailer about a horizontal axis, or jouncing. However, this positioning of the axis together with the biasing force applied to the latter to maintain it engaged with the groove act as an anti-jouncing device which dampens oscillations between the towing vehicle and the trailer about the transverse and longitudinal horizontal axes through the ball joint. Thus, when the vehicle encounters a depression or projection in the roadway, the duration and amplitude of vertical oscillations are substantially shortened by the trailer hitch of the present invention. A significant road hazard is thereby eliminated.

The isolation of the anti-sway control function in the present device from other trailer coupling features permits its construction to provide the most desirable anti-sway characteristics. Compromises, as those found in the above referred to U.S. patent, are no longer necessary. It is of course possible, and it is preferred, to combine the anti-sway device of the present invention with another, independent load equalizing device to provide the vehicle-trailer rig with optimum drive and control characteristics. However, the functioning of one is not affected by the functioning of the other and the effectiveness of one is not compromised in favor of the other since the vertical forces transmitted from the trailer to the vehicle remain substantially constant irrespective of the alignment or the angular deflection of the two.

In a second preferred embodiment of the invention, the torque opposing interengaging groove and detent are incorporated in the fifth wheel of a tractor-semi-trailer rig. A saddle plate of the fifth wheel is provided with grooves that are engaged by cylindrical bars depending from the semi-trailer and biased into engagement with the groove when the semi-trailer is coupled to the truck. The biased bar and groove maintain the semi-trailer aligned with the truck unless subjected to relatively high torques about a king pin of the coupling as when the rig navigates sharp corners at low speeds. However, relatively slight torques, as frequently encountered during the initial stages of emergency maneuvers of such rigs on slippery road surfaces will not disengage the bar from the groove and will maintain the rig in alignment. Most cases of jackknifing can thus be prevented. Thus, the present invention also enables the sizable reduction of a road hazard encountered in connection with the operation of large semi-trailer truck rigs and which has heretofore been accepted as unavoidable.

DESCRIPTION OF THE PREFERRED EMBODIMENTS

Figures 1, 2, 9, 10:
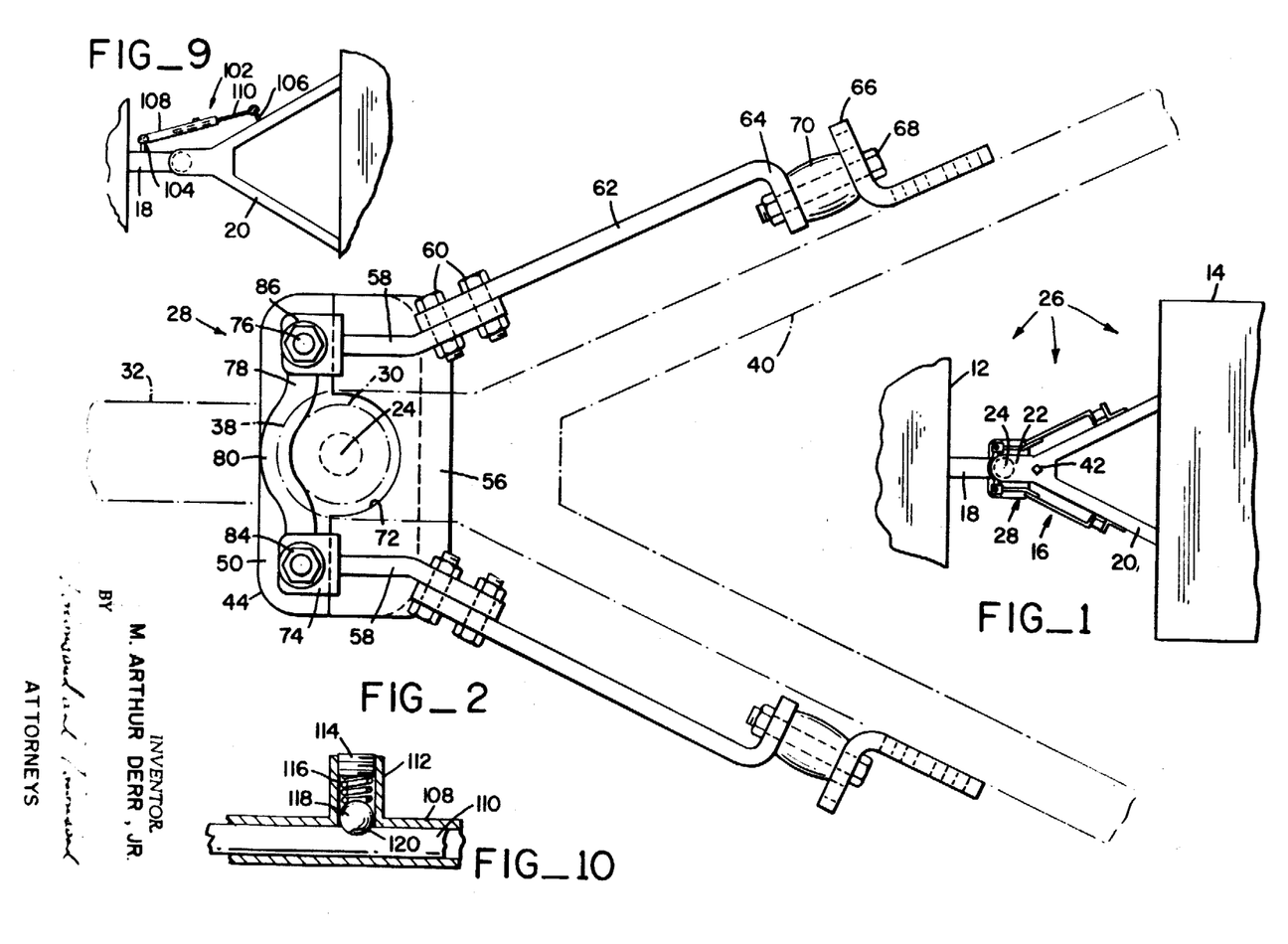
FIG. 1 is a fragmentary plan view of an anti-sway device constructed in accordance with the present invention and installed on a conventional universally movable trailer hitch.
FIG. 2 is a fragmentary, enlarged plan view of the anti-sway device of the present invention and shows, in phantom lines, a conventional ball hitch coupling.
FIG. 9 is a fragmentary, schematic plan view of a trailer hitch connection illustrating another embodiment of the invention.
FIG. 10 is a fragmentary, enlarged plan view, in section, of the detent portion of the anti-sway device illustrated in FIG. 9.

Referring initially to FIG. 1, a towing vehicle 12 is connected to a towed trailer 14 with a trailer hitch 16 to define a trailer rig 26. The hitch comprises a tow bar 18 mounted to the vehicle, a trailer bar 20 mounted to the trailer and a universally movable ball joint 22. The ball joint operates in a conventional fashion and permits pivotal movements of the trailer about a vertical axis 24 when the rig travels along a curved path. To inhibit swaying motions of the trailer about the vertical axis when the rig travels in a straight line an anti-sway device 28 constructed in accordance with the present invention is mounted to the trailer hitch. The anti-sway device maintains the vehicle and the trailer in mutual alignment as long as the torque applied to ball joint 22 does not exceed a predetermined magnitude. That torque is adjustable, as more fully described hereinafter, and is so selected that lateral forces acting on the trailer in a direction transverse to the travel direction are incapable of producing relative pivotal movements of the trailer about the ball joint. Thus, straight line travel of the rig causes no swaying motions of the trailer and results in greater control of the vehicle driver over the rig, and particularly over the trailer. The possibility of accidents as a result from a loss of control over the trailer is thereby substantially reduced.

Figures 3, 4, 5, 6, 7, 8:
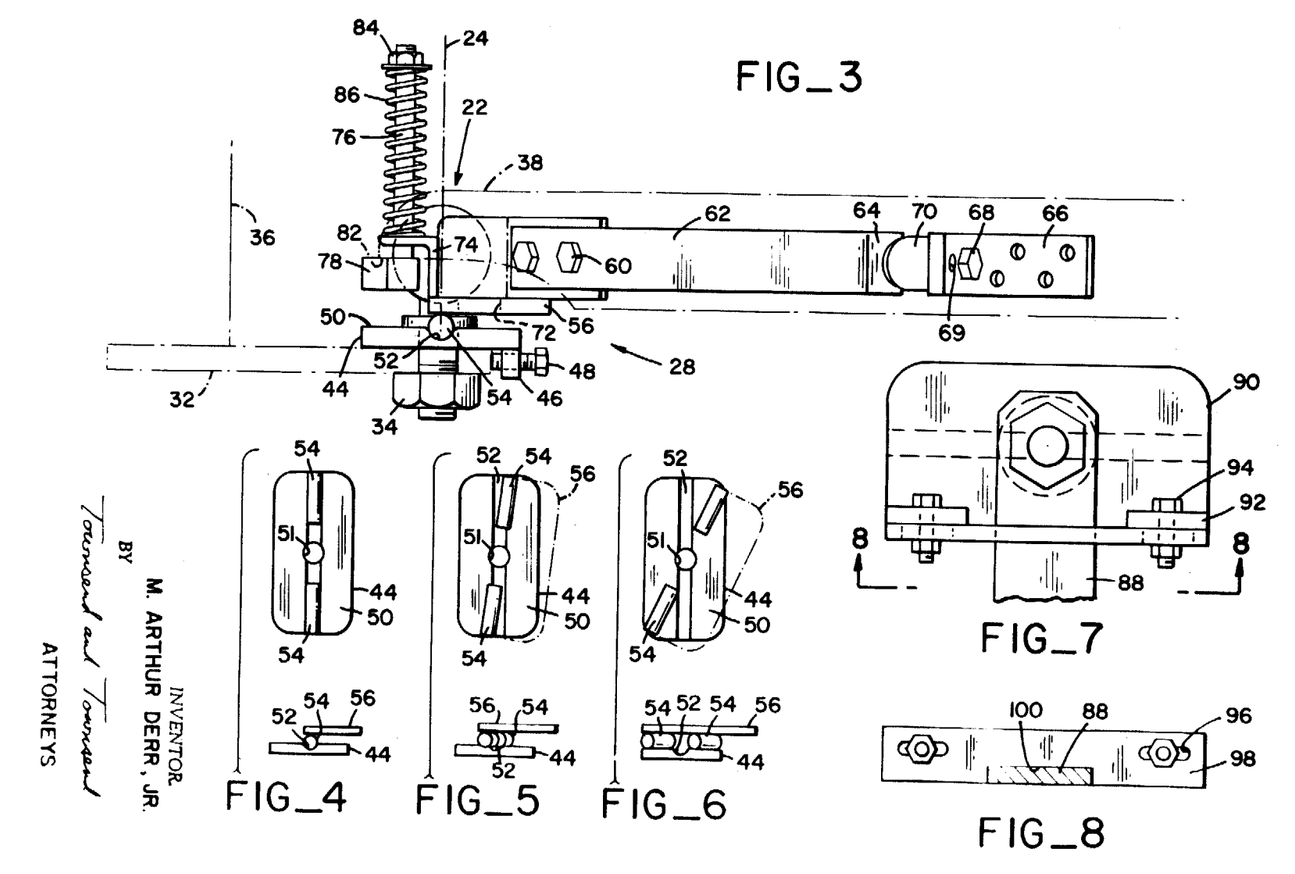
FIG. 3 is a side elevation of the device illustrated in FIG. 2.
FIG. 4 is a schematic plan and side elevation of the anti-sway device during straight line travel with parts deleted for greater clarity.
FIG. 5 is a plan view and side elevation similar to FIG. 4 but shows the device during slight angular deflections.
FIG. 6 is a plan view and side elevation similar to FIG. 4 and shows the device when making sharp turns.
FIG. 7 is a fragmentary plan view of a portion of the device constructed in accordance with another embodiment of the invention.
FIG. 8 is a rear elevational view and is taken on line 8—8 of FIG. 7.

Referring now to FIGS. 2 and 3, a presently preferred form of the invention enables the use of the anti-sway device in conjunction with conventional, existing trailer hitches for use with passenger automobiles and small, e.g. panel trucks of substantially all types. In particular, the trailer hitch illustrated in FIG. 2, which is conventional, comprises the already mentioned ball joint 22 having a hitch ball 30 mounted to a tow bar or mounting tongue 32 with a conventional nut 34. The tongue protrudes rearwardly from an aft end, say bumper 36, of the vehicle 12. The ball joint further includes a conventional, downwardly opening ball socket 38 which forms the forwardmost portion of a trailer bar or yoke 40 protruding forwardly from the trailer. To couple the trailer to the vehicle the ball socket 38 is vertically aligned with hitch ball 30, dropped thereon, and a suitable latch 42 (schematically illustrated in FIG. 1) is closed to lock the socket to the ball and prevent their accidental separation.

Anti-sway device 28 comprises a flat plate 44 disposed between mounting tongue 32 and hitch ball 30 and firmly secured to the mounting bar by the tightened nut 34. A rearward end of the plate includes a pair of laterally spaced downwardly depending threaded blocks 46 through which a pair of horizontally disposed set screws 48 extend. The set screws engage the rear end of mounting tongue 32 and prevent rotational movement of plate 44 about the vertical axis 24 through ball joint 22 even under severe forces.

The upwardly facing side 50 of the plate is flat, includes a cutout 51 (shown in FIG. 4) through which the shank of hitch ball 30 extends, and includes a pair of aligned substantially semicircular and relatively shallow or small grooves 52 on each side of the cutout. The grooves are oriented perpendicular to the direction of straight line travel (or the longitudinal axis of the vehicle) and receive therein a pair of spaced apart, mutually aligned cylindrical protrusions 54 which have a diameter complementary to the diameter of the semicylindrical grooves so that the protrusions nest. The protrusions depend from an upper plate 56, are permanently secured thereto as by welding, and the upper plate ends at about the vertical alignment with the protrusions as illustrated in FIG. 3. The forward end of plate 56 also includes a semicircular cutout 72 through which hitch ball 30 extends when it is engaged by ball socket 38.

A pair of flat outwardly angled upright mounting brackets 58 are secured to the upper surface of plate 56, as by welding them thereto, and include bores through which pairs of mounting bolts 60 extend for securing elongate L-shaped bars 62 to the brackets. The other ends of the bars define short legs 64 secured with threaded bolts 68 to angle irons 66 which are mounted to the sides of trailer yoke 40. The outwardly protruding leg of each angle iron and short leg 64 of each bar 62 are spaced apart by a compressable rubber sleeve 70 provided with a hole through which bolt 68 extends. By tightening the bolts the L-shaped bracket and upper plate 56 are secured to the trailer yoke in a substantially horizontal position. Slight, substantially vertical movements of upper plate 56 and cylindrical protrusions 54 are possible by applying vertically acting forces to it whereby rubber sleeves 70 are resiliently compressed and the bars pivot about a substantially horizontal axis. Angle irons 66 include a second, outer bore 69 and L-shaped bars 62 can be inserted so that their short legs 64 extend outwardly, to provide for the mounting of anti-say device 28 to trailer yokes of differing shapes and sizes.

A pair of angular support brackets 74 are laterally spaced from ball socket 30 and extend upwardly from a forwardmost end of plate 56 and fixed thereto. The horizontal leg of the support brackets includes bores (not separately shown) through which a pair of elongate tensioning bolts 76 extend. The lower end of the bolts is secured to a transverse, outwardly bowed tensioning base 78 which interconnects the two bolts. A center portion 80 of base 78 extends into close proximity of hitch ball 30 and engages a downwardly facing underside 82 of ball socket 38. Tensioning nuts 84 are secured to the upper ends of bolts 76 for the compression of helical compression springs 86 disposed about the bolts. The other ends of the springs are supported by the horizontal legs of the angular support brackets 74. Thus, springs 86 bias tensioning base 78 against underside 82 of the ball socket and upper plate 56 downwardly towards flat plate 44.

Although the positioning of grooves 52 and protrusions 54 on plates 44 and 56 mounted to tow bar 32 and trailer yoke 40, respectively, can be reversed from that shown and described, space considerations make it preferable not to do so. By mounting cylindrical protrusions 54 to upper plate 56 the forward end of the upper plate can terminate flush with the protrusions. This provides sufficient space for placing tensioning base 78 about ball 30 forward of the hitch ball. Otherwise the tensioning base would have to be placed rearwardly of the hitch ball where it can interfere with equipment mounted to the trailer yoke and/or with the operation of the suspension system for plate 56.

Referring to FIGS. 2 through 6, in use flat plate 44 and upper plate 56 together with tensioning bolts 76, tensioning base 78 and springs 86 are secured to mounting tongue 32 and trailer yoke 40 in the above described manner. Thereafter ball socket latch 42 (shown in FIG. 1) is opened and the socket is dropped over hitch ball 30. It will be noted that springs 86 bias plate 56 downwardly until the horizontal leg of angular support brackets 74 are engaged by tensioning base 78. When the ball socket 38 is dropped over the hitch ball cylindrical protrusions 54 are engaged in grooves 52 whereupon upper plate 56 and support brackets 74 are moved upwardly in opposition to the spring force until the hitch ball fully rests in the ball socket. Thereafter, latch 42 is closed to prevent a separation of the hitch ball and socket. Springs 86 now bias cylindrical protrusions 54 with a given force into grooves 52. This force can be adjusted by turning tensioning nuts 78 to compress or release the springs. The independent mounting of plates 44 and 56 to the tow bar and the trailer bar, respectively, and their vertical separability permits the transfer of vertical forces between them without transmitting bending moments between the vehicle and the trailer to thereby prevent the anti-sway device from acting as a load equalizing device.

To properly position plate 44 after the initial installation of anti-sway device 28, ball hitch nut 34 is temporarily loosened and the towing vehicle and the trailer are brought into exact alignment. This places plate 44 automatically into the proper position by rotating it about the hitch ball shank. Set screws 48 are then tightened against the aft end of mounting tongue 32 and nut 34 is retightened. From now on the cylindrical protrusions register in the grooves each time the vehicle and the trailer are in mutual alignment.

Figure 17:
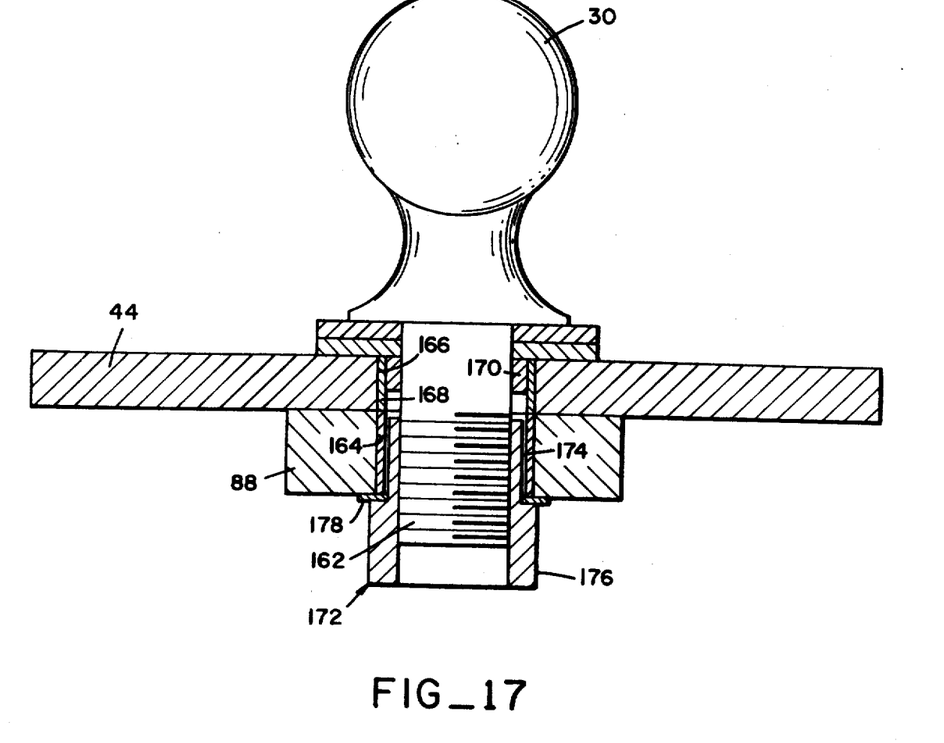
FIG. 17 is an enlarged, cross sectional elevation through a prior art ball hitch mounting in accordance with the present invention the groove plate of the anti-sway device to a tow bar depending rearwardly from the towing vehicle.

Referring now briefly to FIG. 17, the present invention also provides means for bolting the anti-sway device to existing ball joint trailer hitches in which a hitch ball 30 is conventionally bolted to the rearwardly extending tow bar or mounting tongue 88. Such balls generally include a threaded shank portion 162 which is relatively short and just of sufficient length so that it can extend through the bore in tongue 88 and be engaged by a conventional threaded nut (shown in FIG. 3). When the anti-sway device of the invention is installed on a conventional trailer hitch by bolting grooved plate 44 to the mounting tongue the length of the ball shank 162 becomes insufficient for adequate engagement by a conventional nut.

Since hitch balls are relatively expensive and to enable the use of hitch balls employed on prior art trailer hitches bores 164 and 166 in mounting tongue 88 and plate 44, respectively, are enlarged and receive centering bushings 168 and 170 which align the bores in the tongue of the plate and center shank 162 of the hitch ball when it is placed into the bores and the bushings. A nut 172 includes a turned down portion 172 and a hexagonal portion 176 and is internally threaded for engagement with the threads on shank 162. The outer diameter of the turned down nut portion is sufficiently small so that it can enter in the space between the exterior of the shank and the interior of bushing 168 in bores 164 and 166. Moreover, the turned down portion is of sufficient length so that when the nut is engaged with shank 162 and tightened until the shoulder between the turned down portion and the hexagonal portion rests against a lock washer 178 on the underside of tongue 88 the nut engages a threaded shank length which is at least equal to and preferably greater than the diameter of the shank. In this manner, prior art ball hitches can be employed for use with the anti-sway device of the present invention and thereby help reduce the overall cost of an installation of the anti-sway device.

Referring to FIGS. 1 through 6 and turning to the use of the anti-sway device of the present invention, during straight-away travel the cylindrical protrusions remain in grooves 52. Even if the trailer is subjected to lateral forces, such as cross winds or forces caused by a road crown, it continues to be aligned with the towing vehicle. Small relative angular displacements of the vehicle and the trailer, say during high speed navigation of slight curves such as when driving at freeway speeds about full speed freeway curves, there will result a compression of rubber sleeves 70 to accommodate such slight deflections.

When navigating sharper turns at low speeds the torque applied to ball joint 22 increases significantly until an upwardly acting force component caused by such torque moves plate 56 and cylindrical protrusions 54 in upward direction and out of groove 52. At the same time slight angular deflections between plates 44 and 56 take place. When the lowermost portion of the cylindrical protrusions clears grooves 52 the further pivotal movement of trailer yoke 40 about vertical axis 24 only requires sufficient torque to overcome the relatively low frictional forces developed between the cylindrical protrusions 54 and the upwardly facing flat side 50 of plate 44. This force, or torque, is substantially less than the force, or torque, required to initially disengage the cylindrical protrusions 54 from grooves 52 and remains constant regardless of the degree of angular deflection between the vehicle and the trailer. Presently it is preferred to construct the groove semicircularly with a depth of 5/16 inch and provide cylindrical protrusions of a diameter of five-eighths inch so that the two are disengaged after a slight initial angular deflection between plates 44 and 56 of only about 5°. Satisfactory results are obtained if the initial angular deflection falls between about 2 ½° and about 10°. It will also be noted that the total vertical force transmitted from the trailer to the vehicle remains constant irrespective of the angular deflection or the alignment of the two. Shifting loading of the vehicle and the trailer as a result of changes in their angular positions which adversely affects the control over them are thereby eliminated.

When the rig approaches straight line travel yoke 40 begins to realign itself with the vehicle axis. Just prior to actual alignment the downwardly acting forces from springs 86 cause the application of a radial force component which biases the trailer yoke and the vehicle into mutual alignment.

When the rig drives through a depression or projection in the road so that it pivots about a horizontal axis extending through the center of hitch ball 30 and ball socket 38 transversely to the longitudinal axis of the rig cylindrical protrusion 54 rides up along groove 52 in flat plate 44 secured to mounting tongue 32 of towing vehicle 12. This biases the cylindrical protrusion upwardly and against the force exerted by compression springs 86 to thus counteract the relative pivotal movement between the vehicle and the trailer about a horizontal axis through the center of ball 30 and acts as a dampener or an anti-jounce device. In addition to limiting jouncing of the trailer to a few, dampened oscillations the force exerted by spring 86 biases protrusion 54 and groove 52 into their mutual alignment in which the vehicle and the trailer are in their normal, horizontal operating position.

The engagement of protrusion 54 and groove 52 also dampens jounce, or axial sway, about the horizontal axis through ball 30 and socket 38 that is parallel to the longitudinal rig axis. If axial sway occurs, as from an unevenness of the road surface, shifting loads on the trailer, unequal trailer tire pressures and the like, an axial twist of the trailer is counteracted, dampened and the trailer and the vehicle are biased into their aligned position by either one or both of rubber sleeve 70 or spring 86.

After use ball joint 22 is disconnected as in the past by opening latch 42 and pulling trailer yoke 40 upwardly until ball socket 38 is free of hitch ball 30. It will be noted that no components of the anti-sway device need to be disconnected since the portions mounted to the trailer bar and the tow bar, respectively, are fully independent of each other and are separately mounted to the vehicle and the trailer. Upon connection of the trailer, however, the two are automatically engaged and co-act in the above described manner without the need for further mounting, coupling or connecting parts of the anti-sway device.

In addition to the anti-sway device of the present invention trailer hitch 16 can be provided with additional auxiliary equipment such as any one of several known load equalizing devices. Since such devices are known they are not illustrated or shown herein.

Referring to FIGS. 7 and 8, another embodiment of the invention, particularly for use with relatively narrow mounting tongues 88 as contrasted with mounting tongue 32 illustrated in FIG. 2 as having a relatively wide aft portion, comprises a lower grooved plate 90 having a pair of laterally spaced blocks 92 through which bolts 94 extend. The bolts further extend through elongate, horizontally disposed slots 96 in a lock bar 98 having a rectangular cutout 100 tightly fitting over and engaging a portion of tongue 88 forward of grooved plate 90. Bolts 94 are tightened against lock bar 98 to thereby prevent pivotal movements of the plate about vertical axis 24 (shown in FIGS. 2 and 3) even under severe torques. Slots 96, together with any necessary shimming (not shown) between blocks 92 and 98, permit the precise positioning of the grooved plate for its initial alignment with the cylindrical protrusions (not shown in FIGS. 7 and 8) mounted to the trailer hitch. In all other respects, and particularly as far as its functioning is concerned, the embodiment shown in FIGS. 7 and 8 is identical to that shown in FIGS. 1 through 6.

Referring not to FIGS. 9 and 10, a still further embodiment of the present invention is particularly adapted for use as a side mounted anti-sway device 102 which comprises a pair of spherical mounting members 104 and 106 mounted to the tow bar 18 and trailer bar 20, respectively. The spherical members universally movably mount a rectangular housing 108 and a rectangular bar 110 telescopingly disposed in the housing.

An intermediate portion of the housing includes a preferably cylindrical, outwardly projecting tubular arm 112. A steel ball or sphere 118 is disposed inside the tubular arm and is biased against and into a depression or groove 120 by a compression spring 116 secured to the tubular arm with a threaded plug 114.

The groove and the arm are so positioned that during straight-away travel of the trailer and the vehicle the ball engages recess 120. This engagement of the recess by the ball prevents pivotal movements between the trailer bar and the tow bar until they are subjected to a sufficient torque that the resulting linear telescoping forces between the housing and the rectangular bar overcome the engagement force applied by the ball. After disengagement of the ball and the groove the frictional forces between the ball and the flat surfaces of the bar are substantially less than the forces required for initial disengagement of the protrusion and the groove and the frictional forces remain constant to facilitate the ease with which the pivot connection between the towing vehicle and the trailer is operated to maneuver around sharp, e.g. 90° turns, with ease. Upon return of the trailer and the towing vehicle to their mutually aligned position groove 120 is again engaged by ball 118.

Referring now to FIGS. 11 through 16, in another preferred embodiment one anti-sway device of the present invention is installed on a semi-trailer rig 122 comprising a tractor 124, a first trailer 126 carried by the tractor and a second trailer 127 carried by an axle assembly 128 and coupled to the first semi-trailer with a tow bar 129. The tractor and the axle assembly each include a fifth wheel assembly 132 for connection of the trailers to the tractor and the axle assembly, respectively.

Referring now particularly to FIGS. 12 through 15, each fifth wheel assembly comprises a generally horseshoe shaped saddle plate 134 having a rearwardly opening slot 136 adapted to receive a king pin 138 depending downwardly from the semi-trailer adjacent a forward end thereof. The saddle plate includes a sloped aft portion 140 and a semicircular, flat and substantially horizontally disposed forward portion 142. To couple the tractor and the semi-trailer, or the axle assembly and the semi-trailer, the tractor is backed up under the trailer so that king pin 138 enters slot 136 until the king pin rests at a forward end 144 of the slot. An internal locking mechanism (not separately shown) engages the king pin and retains it to the saddle plate while permitting relative pivotal movements between the king pin and the saddle plate about the vertical axis of the pin for the navigation of curves by the rig. The vertical weight of the trailer carried by tractor 124 is transmitted to the tractor via a downwardly facing pressure plate 146 secured to U-shaped beams 147. The pressure plate bears adjacent forward portion 142 of saddle plate 134.

Saddle plate 134 also includes a pair of aligned grooves 148 which extend perpendicular to the longitudinal axis of the tractor and radially outward from the axis of king pin 138. A pair of axially aligned cylindrical bars 150 extend through openings 151 in pressure plate 146 and engage grooves 148. The cylindrical bars are mounted via a compressable rubber pad 152 to an adjustable support structure 154. The support structure is carried on the upper side of pressure plate 146 and includes a plate 156 which is movable in a vertical direction along upright bolts 158 secured to pressure plate 146 within the confines determined by upper nuts 160 and the pressure plate. Full release of the plate 156 by backing-off nuts 160 prevents the exertion of any force by cylindrical bars 150 and thus enables an effortless, conventional coupling of the semi-trailer to the towing vehicle.

In use and during straight line travel of the rig cylindrical bars 150 rest in grooves 148. Depending on the adjustment of nuts 160 the bars extend a greater or lesser distance into plate openings 151 and rubber pad 152 biases the cylindrical bars with a greater or lesser force into the grooves. The engagement of the bars in openings 151 prevents the transmission of torques to rubber pad 152. Slight angular deflections between the tractor and the trailer while driving at high speeds through light curvature turns, and during freeway driving can be accomodated by permitting slight angular, resilient movements of the saddle plate through a limited arc. During sharp turning maneuvers at low speed around sharp corners, for example, the torque acting about king pin 138 exceeds the force exerted by the biased cylindrical bars 150 and angularly deflects the tractor with respect to the semi-trailer about the king pin. This results in a relative upward movement of the cylindrical bars into openings 151 through a further compression of rubber pads 152 until the lower end of the bars is flush with the lower side of pressure plate 146 and rides on the flat surface of forward saddle plate portion 142.

Once the cylindrical bars have moved out of the grooves a relatively small force is exerted by the bars in opposition to relative pivotal movements between the tractor and the semi-trailer. Until the bar moves out of the grooves, however, a relatively high deflection opposing force is exerted by the cylindrical bar and prevents relative pivotal movements, except those permitted by slight pivotal movements of the saddle plate, between the truck and the trailer. Thus, when relatively small torques act about the king pin, as encountered during the initial phases of emergency operations, e.g. when braking on an icy road surface, free pivotal movements of the semi-trailer with respect to the tractor about the king pin are prevented. If such pivotal movements were permitted to take place under low loads the momentum would increase rapidly and result in the heretofore common truck jackknifings.

Figures 11, 12, 14:
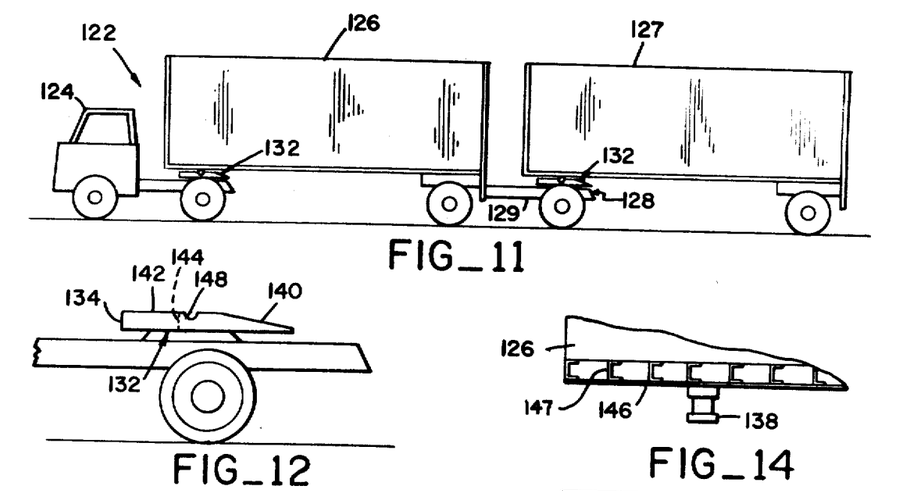
FIG. 11 is an illustration of another embodiment of the invention and shows an anti-sway device installed on a semi-trailer rig.
FIG. 12 is a fragmentary, enlarged side elevational view of a fifth wheel mounted to a tractor for semi-trailers.
FIG. 14 is a fragmentary, side elevational view of a forward end of a semi-trailer and illustrates a vertically disposed connecting pin mounted to the trailer.
Figure 13:
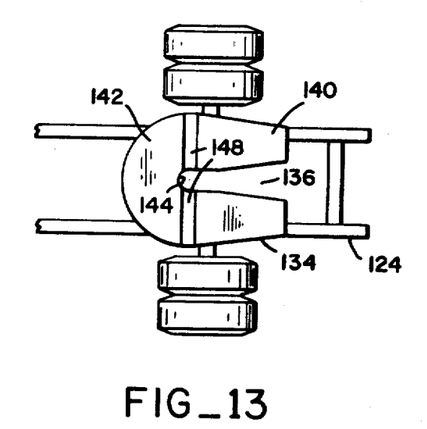
FIG. 13 is a fragmentary plan view of the truck portion illustrated in FIG. 12.
Figure 15:
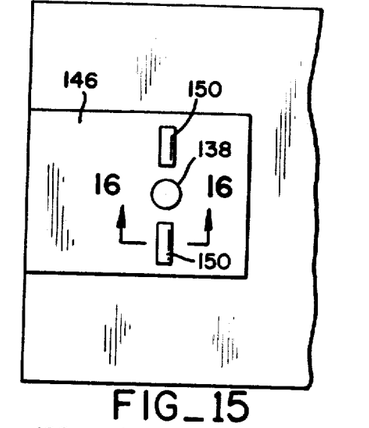
FIG. 15 is a fragmentary bottom view of the trailer portion illustrated in FIG. 14.
Figure 16:
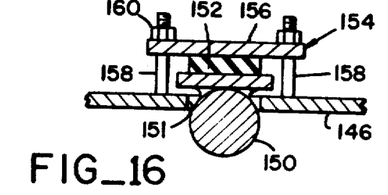
FIG. 16 is an enlarged, fragmentary elevational view, in section, and is taken on line 16—16 of FIG. 15.

As already mentioned in conjunction with the description of the preferred embodiment of the invention upon completion of a sharp turn the cylindrical bars are biased into the grooves in the saddle plate and thereby biases the semi-trailer into alignment with the tractor for subsequent straight-line travel.

Modifications of the anti-sway device of the present invention can of course be made. For example, as already briefly alluded to, the relative position of the grooved plate and the cylindrical protrusions can be inverted, the plates can be mounted and secured independently of the hitch ball and/or the ball socket for arrangements which might be particularly desirable for certain couplings, applications or uses. Similarly, the groove and cylindrical bar mountings on the fifth wheel can be inverted, the adjustment means for applying the vertical force with which the cylindrical bar is biased into the groove on the fifth wheel can be altered to employ alternative means and the relative orientation of the grooves can be changed as needed. Such modifications are within the scope of this invention.

I CLAIM:

1. An anti-sway apparatus for a trailer movably coupled to a towing vehicle comprising: detent means for attachment to the vehicle and the trailer, means for resiliently mounting the detent means to at least one of the vehicle and the trailer and permitting minor relative movements of the detent means with respect to at least the one of the vehicle and trailer about at least an upright pivotal axis, the detent means including means exerting a relatively large first force opposing angular deflections about the upright pivotal axis between the vehicle and the trailer during relatively small angular deflections between the two, and means for reducing the first force to a substantially constant, lesser second force after the angular displacement between the vehicle and the trailer exceeds said relatively small deflection to thereafter permit relatively free further pivotal movements and to facilitate the return of the vehicle and the trailer into their aligned positions.

2. A trailer hitch according to claim 1, wherein the first force exerting means comprises a detent cooperating with a groove, and including means for resiliently and adjustably biasing the detent and the groove towards each other, and means for disengaging the detent and the groove after an angular deflection between the the vehicle and the trailer of between about 2 ½° and about 10°.

3. A trailer hitch according to claim 1, wherein the first force reducing means comprises a saddle plate secured to a tractor for connection with a semi-trailer, and wherein the first force exerting means comprises a groove and a matching detent defined by the saddle plate and the semi-trailer for interengagement when the tractor and the semi-trailer are aligned, and means for biasing the groove and the detent into mutual engagement for the exertion of the first force.

4. A trailer hitch according to claim 3, wherein the groove is defined by one of the saddle plate and the semi-trailer, and the detent comprises bar means carried by the other one of the saddle plate and the semi-trailer, and including means permitting relative vertical movement between the other one of the saddle plate and the semi-trailer and the bar means to enable the disengagement of the groove and the detent during angular deflections between the tractor and the semi-trailer.

5. A trailer hitch according to claim 1, wherein the vehicle and the trailer are universally movably connected, and including anti-jouncing means for opposing relative angular deflections between the vehicle and the trailer about a substantially horizontal axis, the anti-jouncing means having means for applying a force generated by the first force exerting means in opposition to the deflections about the horizontal axis.

6. A trailer hitch according to claim 5, wherein the anti-jouncing means and the first force exerting means are defined by a groove and a detent disposed in a substantially horizontal plane and connected to the vehicle and the trailer, the groove and the detent having an orientation substantially perpendicular to a longitudinal axis of the vehicle and the trailer, and being further positioned in a vertical plane intersecting the coupling means.

7. Apparatus according to claim 1, wherein the first force exerting means comprises a substantially horizontal plate defining a groove, means defining a detent fitting into the groove, and means biasing the groove and the detent into mutual engagement for generating the first force between the groove and the detent.

8. Apparatus according to claim 7, wherein the groove and the detent are horizontally oriented and positioned perpendicular to a longitudinal axis between the vehicle and the trailer, and wherein the detent and the groove are spaced from a coupling between the vehicle and the trailer to counteract relative angular deflections between the vehicle and the trailer about a horizontal axis through the coupling.

9. Apparatus according to claim 8, wherein the coupling comprises a conventional hitch ball mounted to a bar protruding from the vehicle, and including means for rigidly securing the plate defining the groove to the bar, the last-mentioned means comprising a member having a central notch extending over and engaging the protruding bar to prevent lateral movements of the member on the bar, means securing the plate to the bar and permitting pivotal movements of the plate about the vertical axis through the hitch ball, and means for securing the plate to the member to thereby lock the plate to the bar.

10. An anti-sway trailer hitch for use with vehicle-trailer rigs pivotable about a substantially vertical axis of their coupling comprising:
a normally engaged, releasable snap-in device defined by independent first and second members,
means for demountably and independently securing the members to the vehicle and the trailer including bracket means for connection to a trailer bar, bar means secured to one of the members for connecting such member to the bracket means and for adjustment of the trailer hitch to trailer bars of varying shapes, means interconnecting the bar means and the bracket means for positioning the bar means on the trailer bar, and means between the bar means and the bracket means permitting limited relative movements of the bar means with respect to the bracket and the trailer bar permitting slight movements of the bar means and of the member mounted thereto about at least one axis, means for controlling the relative positions of the members so that the snap-in device is engaged when the vehicle and the trailer are in mutual alignment and becomes disengaged in response to pivotal movements of the vehicle and the trailer about said vertical axis, and
means for applying a force biasing the members towards each other to control the required torque about said vertical axis to disengage the snap-in device, said last mentioned means including means for maintaining the total vertical load transmitted to the vehicle substantially constant during relative angular movements between the vehicle and the trailer to prevent shifting loads in the vehicle and the trailer.

11. Apparatus according to claim 10, including means permitting limited vertical motions relative to the bar means of the member connected to the bar means, spring means biasing such member towards the other member, and adjustable means supported by the trailer for controlling the stressing of the spring means.

12. A trailer hitch according to claim 10, wherein a hitch ball of the coupling is mounted to the vehicle, and wherein one of the members comprises plate means concentric with the hitch ball and clamped to the vehicle with the hitch ball, and including means for preventing rotational movements of the plate means with respect to the hitch ball.

13. A hitch according to claim 12, wherein the rotation preventing means includes means for adjusting the relative angular position of the plate means with respect to the hitch ball.

14. A hitch according to claim 13, wherein the means preventing rotation and the adjustment means comprises spaced apart set screws simultaneously engaging the plate means and the vehicle.

15. An anti-sway trailer hitch for use with universally movable trailer hitches to prevent swaying motions of a trailer towed by a towing vehicle at relatively high speeds, the device comprising:
a substantially horizontally mounted plate disposed between a first hitch element and a tow bar, the plate having a groove,
means for securing the plate to the tow bar and for controlling the plate position so that the groove is disposed substantially perpendicular to the vehicle axis, detent means having protrusions nestable in the groove for mounting to and concentrically with a second hitch element secured to a trailer bar, means for mounting the detent means and for positioning the protrusion in vertical alignment with a vertical axis through the hitch, the mounting means permitting limited vertical movement of the detent means, means engaging an underside of the second hitch element, and spring means supported by the engaging means biasing the detent means towards the grooved plate for engagement of the groove by the protrusions and preventing pivotal movement of the trailer about the vertical axis under lateral forces acting on the trailer during relatively high speed straight line travel of the vehicle and the trailer.

16. A device according to claim 15, wherein the protrusions define the substantially forwardmost portions of the detent means, and wherein the second hitch element engaging means comprise a bar disposed on the underside of the second element forward of and in close proximity of the first hitch element.

17. A quick-release anti-sway device for trailer hitches for limiting swaying motions of a trailer universally movably coupled to and towed by a towing vehicle, the device comprising:

a first member mounted to a tow bar concentrically with a first hitch element and having an upwardly facing surface, a second member mounted to a trailer bar concentrically with a second hitch element and having a downwardly facing surface whereby connection of the hitch element positions the surfaces in overlying relation, means permitting limited vertical movement of one of the members independently of the hitch elements towards and away from the other one of the members, spring means resiliently biasing said one member towards said other member to cause forces between the surfaces which oppose relative angular movements between the hitch elements about a substantially vertical axis whereby the members are operatively engaged and disengaged by coupling and uncoupling of the trailer hitch; and means permitting limited movements of at least one of the members with respect to the corresponding bar so that limited angular deflection between the vehicle and the trailer can take place while the force developed between the members is too small to move the members with respect to each other.

18. A stabilizing device for a trailer hitch between a towing vehicle and a towed trailer permitting relative angular movements between the vehicle and the trailer about a horizontal axis, the device comprising: first means secured to one of the vehicle and the trailer and movable with respect thereto in a plane extending in a direction substantially perpendicular to a longitudinal axis between the vehicle and the trailer, biasing means resiliently forcing the first means towards a portion of the other one of the vehicle and the trailer, the portion being positioned in a plane which substantially includes said horizontal axis, and second means coupled to the first means for engaging the portion, the portion having a surface engaged by the first means that is eccentric with respect to the horizontal axis, whereby pivotal movements between the vehicle and the trailer about the horizontal axis are counteracted by the biasing means.

19. A device according to claim 18, wherein the portion comprises a substantially horizontal, flat plate having a groove aligned with a substantially vertical plane that includes the horizontal axis, and wherein the second means comprises bar means having a configuration complementary to that of the groove and secured to the first means for engagement of the groove when the vehicle and the trailer are aligned.

20. A device according to claim 19, wherein the plate is secured to the vehicle and the first movable means is secured to the trailer.

21. Apparatus according to claim 18, wherein the surface is positioned with respect to said plane to at least counteract pivotal movements of the trailer and the towing vehicle about a horizontal axis transverse to the longitudinal axis.

22. Apparatus according to claim 18 wherein the surface is positioned with respect to the plane to at least counteract pivotal movements between the vehicle and the trailer about a longitudinal horizontal axis of the vehicle and the trailer.

23. Apparatus according to claim 18 wherein the surface is positioned with respect to said plane to counteract pivotal movements between the vehicle and the trailer about a plurality of angularly offset horizontal axes.

24. In a fifth wheel connection for a semi-trailer, the connection having a saddle plate for securing to a towing vehicle and a substantially vertically disposed pin secured to the trailer for engaging the saddle plate and transmitting towing forces from the saddle plate to the semi-trailer, the semi-trailer also including means for the transmission of vertical forces to the saddle plate and the towing vehicle, the improvement comprising: first means operatively connected to the saddle plate and the semi-trailer normally exerting a force opposing substantial relative angular deflections between the towing vehicle and the semi-trailer so that the towing vehicle and the semi-trailer remain substantially aligned until a predetermined minimum torque acting about the vertical pin is applied, means reducing the torque to a substantially constant, lesser second torque after and in response to a predetermined initial angular deflection between the towing vehicle and the semi-trailer to permit relatively free pivotal movement between the vehicle and the trailer after the initial deflection and facilitate the realignment of the vehicle and semi-trailer, and means for resiliently mounting the first means to at least one of the vehicle and the trailer and permitting minor angular deflections between the vehicle and the trailer before the predetermined minimum torque acts about the pin to permit high speed navigation of full-speed curves while preventing trailer swaying during relatively high speed, straight line travel.

25. A device according to claim 24, wherein the force exerting means comprises means defining a groove, a bar for engagement of the groove, the groove defining means being secured to one of the towing vehicle and the semi-trailer and the bar means being secured to the other one of the towing vehicle and the semi-trailer, and means resiliently biasing the groove and the bar into mutual engagement when the towing vehicle and the semi-trailer are aligned.

26. Apparatus according to claim 25 including means for adjusting the force with which the groove and the bar means are biased into engagement to thereby adjust the necessary torque for overcoming the deflection opposing force and facilitate the coupling and uncoupling of the vehicle and the trailer.

27. Apparatus according to claim 25, wherein the groove is defined by the saddle plate and the bar is secured to the semi-trailer.

28. Apparatus according to claim 27 including means permitting substantially vertical movements of the bar towards and away from the groove to enable slideable movements between the bar and flat portions of the saddle plate during angular deflections between the towing vehicle and the semi-trailer.

29. In a universally movable connection between an automobile and a trailer, the connection having a coupling ball including a threaded shank portion bolted to a tow bar extending rearwardly of the automobile, and a ball socket mounted to a trailer bar for placement over the ball and the forming of the connection, the improvement comprising: a bolt-on anti-sway device including a plate disposed between the ball and the tow bar and having an aperture through which the threaded shank portion extends, a member movably mounted to the trailer bar, means biasing the member towards the plate, a groove interengagable with a matching detent defined by the plate and the member for exerting a force opposing an initial angular deflection between the automobile and the trailer, and an adapter nut extending partially into the aperture, threaded onto the shank portion and holding the ball, the plate and the tow bar firmly together.

30. Apparatus according to claim 29, wherein the shank portion has an insufficient length for full engagement with a conventional nut, wherein the plate and the tow bar include aligned bores having a diameter greater than the diameter of the shank portion, and wherein the adapted nut includes a reduced diameter section extending into a space between the shank portion and the enlarged hole in the tow bar.

31. Apparatus according to claim 30 including means for centering the shank portion with respect to the oversized bores.

32. Apparatus according to claim 31, wherein the length of thread of the shank portion engaged by the adapter nut exceeds the diameter of the shaft portion.

33. Apparatus for preventing swaying motions of a trailer universally movably hitched to a towing vehicle during relatively high speed straight line travel without impairing high speed travel maneuvers of the vehicle and the trailer, the apparatus comprising: normally engaged means exerting a first force opposing angular deflections about an upright axis between the vehicle and the trailer for maintaining the vehicle and the trailer in alignment, means permitting minor angular deflections between the vehicle and the trailer while the first mentioned means remain in engagement, the minor deflection permitting means including means for biasing the engaged means into a position in which the vehicle and the trailer are aligned, and means for reducing the first force after slight initial angular deflection between the vehicle and the trailer and disengagement of the normally engaged means to thereafter permit relatively free further pivotal movements between the vehicle and the trailer.

34. Apparatus according to claim 33 wherein the minor deflection permitting means comprises at lease one resilient member disposed between the normally engaged means and at least one of the vehicle and the trailer for yieldingly maintaining the vehicle and the trailer in alignment while permitting slight angular deflections between the two during high speed driving maneuvers.

35. Apparatus according to claim 34, wherein the resilient member is disposed between the normally engaged means and the trailer only.

36. Apparatus according to claim 33 including means for mounting at least a portion of the normally engaged means to one of the vehicle and the trailer, and including a pair of cooperating resilient members biasing the normally engaged means into an aligned position and permitting slight relative angular deflections between the vehicle and the trailer through compression of the resilient members.

37. Apparatus according to claim 33 wherein the minor deflection permitting means includes means permitting minor angular deflections about the upright axis and about a substantially perpendicular, horizontal axis to simultaneously provide for minor lateral angular deflections and vertical angular deflections between the vehicle and the trailer without disengaging the normally engaged means.

38. A trailer hitch for the controlled high speed traveling of a vehicle-trailer rig with substantially no trailer sway and jounce, the vehicle and the trailer being interconnected by a universally movable ball joint, the control hitch comprising: a snap-in device defined by independent first and second members having a groove in one of the members cooperating with a detent in the other member, means for securing one of the members to the vehicle and the other member to the trailer so that interengaging surfaces of the groove and the detent are parallel to a horizontal axis that is perpendicular to a longitudinal rig axis, and the groove surface is eccentric relative to the horizontal axis and in a plane that includes in a vertical plane that substantially includes the horizontal axis, and means for biasing the members towards each other to thereby control the required torque for relative movements between the members about vertical and horizontal axes before disengagement of the snap-in device occurs, whereby vertical and horizontal sway motions of the trailer with respect to the vehicle are substantially eliminated until a torque set to be greater than torques normally encountered during high speed, straight line travel of the rig are applied to the members.

39. A hitch according to claim 38 including means yieldingly permitting limited relative angular deflections between the vehicle and the trailer about a vertical axis of the ball joint for maneuvering the rig at high speeds without disengaging the snap-in means.

40. A hitch according to claim 38, including means yieldingly permitting relative angular deflections between the vehicle and the trailer about the horizontal axis of the ball joint without disengaging the detent and the protrusion to permit and dampen slight jouncing movements of the trailer during high speed highway travel.

41. An anti-sway apparatus for a trailer coupled to a towing vehicle and pivotable with respect thereto about an upright axis comprising: detent means defined by cooperating first and second members, means for mounting the first and second members to the vehicle and the trailer, respectively, the first and second members including resilient means permitting minor angular deflection between the trailer and the towing vehicle about an upright axis from an initial position in which the vehicle and the trailer are aligned and means exerting a first force opposing angular deflections about the upright axis which increases rapidly from zero to a maximum in response to and over the minor angular deflection between the vehicle and the trailer, and means for reducing the first force to a substantially constant, lesser second force after the angular deflection between the vehicle and the trailer exceeds said minor angular deflection to thereafter permit relatively free further pivotal movements and to facilitate the return of the vehicle and the trailer into their aligned positions.

* * * * *